United States Patent
Donelson et al.

(10) Patent No.: US 7,045,239 B2
(45) Date of Patent: May 16, 2006

(54) LAMINATED STRUCTURE AND METHOD OF FORMING SAME

(75) Inventors: Richard Donelson, Mount Waverley (AU); Theresa Lin, Wantirna South (AU)

(73) Assignee: Ceramic Fuel Cells Limited, Victoria (AU)

( * ) Notice: Subject to any disclaimer, the term of this patent is extended or adjusted under 35 U.S.C. 154(b) by 445 days.

(21) Appl. No.: 10/169,386

(22) PCT Filed: Dec. 19, 2000

(86) PCT No.: PCT/AU00/01560

§ 371 (c)(1),
(2), (4) Date: Nov. 5, 2002

(87) PCT Pub. No.: WO01/49485

PCT Pub. Date: Jul. 12, 2001

(65) Prior Publication Data

US 2003/0129460 A1   Jul. 10, 2003

(30) Foreign Application Priority Data

Dec. 30, 1999   (AU) .................................. PQ4921

(51) Int. Cl.
*H01M 4/86*   (2006.01)
*H01M 8/12*   (2006.01)

(52) U.S. Cl. ............................. 429/33; 429/37; 429/40; 429/44; 428/701; 428/702

(58) Field of Classification Search ................ 428/697, 428/699, 701, 702; 427/115; 264/616, 619; 156/89.11, 89.12; 429/40, 44–46, 33, 37

See application file for complete search history.

(56) References Cited

U.S. PATENT DOCUMENTS 3,879,509 A   4/1975   Elderbaum (Continued)

FOREIGN PATENT DOCUMENTS

EP   0 243 858 A2   11/1987

(Continued)

OTHER PUBLICATIONS

Derwent Abstract Acc. No. 10113W/06, L03, R46, R59, NL 7310-168 (Hitachi Ltd.), Derwent Publications Ltd., London, Jan. 22, 1975.

(Continued)

*Primary Examiner*—Gregg Cantelmo
(74) *Attorney, Agent, or Firm*—Dorsey & Whitney LLP

(57) ABSTRACT

A method of alleviating edge curling when laminated structures comprising layers of green material having different shrinkage rates are sintered comprises applying to a face (18) of edges (14) the first layer (10) having the higher shrinkage rate green sinterable material, opposite to the second layer (12) having the lower shrinkage rate green sinterable material, an edge strip (16) of a green sinterable material also having a shrinkage rate lower than the first layer, and then firing the laminated structure. The edge strip may be partly or, advantageously, wholly embedded in the first layer. The sinterable materials of the second layer and edge strip may be the same or similar. The invention is particularly applicable to solid oxide fuel cell sub-structures in which the first layer is the anode layer and the second layer is the electrolyte layer.

69 Claims, 1 Drawing Sheet

U.S. PATENT DOCUMENTS

| | | | |
|---|---|---|---|
| 4,883,497 A | 11/1989 | Claar et al. | |
| 5,270,129 A | 12/1993 | Ishida | |
| 5,312,700 A | 5/1994 | Ishida | |
| 5,326,650 A | 7/1994 | Ishida | |
| 5,935,727 A | 8/1999 | Chiao | |
| 5,937,264 A | 8/1999 | Wallin | |
| 6,458,170 B1 * | 10/2002 | Visco et al. | 29/623.4 |

FOREIGN PATENT DOCUMENTS

| | | |
|---|---|---|
| EP | 0 813 254 A1 | 12/1997 |
| GB | 1 575 677 | 9/1980 |
| WO | WO 96/30207 A1 | 10/1996 |

OTHER PUBLICATIONS

Derwent Abstract Acc. No. 88-172983/25, JP 63112473(Taiyo Yuden KK), Derwent Publications Ltd., London, May 1988.

Derwent Abstract Acc. No. 97-347739/32, (M13), JP 09143512 A (Onoda Cement Co Ltd), Derwent Publications, Ltd., London, Jun. 1997.

Derwent Abstract Acc. No. 96-083946/09, JP 07335239 A (NGK Insulators Ltd.), Derwent Publications Ltd., London, Dec. 1995.

Green, David J. et al., *Residual Stresses in Alumina-Zirconia Laminates*, J. Eur. Ceram. Soc., 1999, vol. 19, No. 13-14, pp. 2511-2517, Elsevier Science Ltd, Barking, Essex, GB.

* cited by examiner

LAMINATED STRUCTURE AND METHOD OF FORMING SAME

BACKGROUND OF THE INVENTION

The present invention relates to laminated structures and is particularly concerned with green and sintered laminated structures and with a method of forming a sintered laminated structure.

When two layers of particulate ceramic or ceramic-like, eg. cermet, materials having different shrinkage rates are laminated and then sintered, there is a tendency for the edges of the laminated structure to curl away from the layer having the lesser shrinkage rate as shrinkage of the layer having the greater shrinkage rate is resisted by the layer having the lesser shrinkage rate. This is a particular problem where the curled edges are not desirable, for example when the edges of the laminated structure are intended to have seals applied to them, such as when the laminated structure forms part of a planar solid oxide fuel cell. The invention is particularly applicable to planar solid oxide fuel cells and, for convenience only, will be described hereinafter generally in relation to such laminated structures. However, it will be understood that the invention is applicable to other sintered, laminated structures.

A planar solid oxide fuel cell (SOFC) consists of a dense solid oxide electrolyte layer laminated with opposed porous electrodes. On shorting the cell through an external load, gaseous fuel oxidises at the anode resulting in release of electrons which flow through the external load and reduce oxygen at the cathode. The charge flow in the external circuit is balanced by ionic current flows within the electrolyte. Thus, at the cathode oxygen from the air or other oxidant is converted to oxygen ions which migrate through the electrolyte layer and react with the fuel at the anode/electrolyte interface. In order to permit the reactions at the respective electrode/electrolyte interfaces, the electrode materials must be porous. On the other hand, it is essential that the electrolyte material prevents the fuel gas and oxygen-containing gas from contacting each other and it must therefore be dense in order to prevent passage of the gases therethrough.

A typical solid oxide electrolyte material used in an SOFC is $Y_2O_3$-doped $ZrO_2$, which is an oxygen ion conductor. However, many other materials have been proposed and the invention is applicable to all of these. A variety of different anode and cathode materials have been proposed for use at the fuel and air sides of SOFCs respectively, but the present invention is only concerned with such materials of a ceramic or ceramic-like nature, such as a $Ni/ZrO_2$ cermet on the fuel side and strontium doped lanthum manganite (LSM or $LaMnO_3$) and strontium doped praseodymium manganite (PSM) on the air side.

In one method a planar SOFC is made by forming a green ceramic or ceramic-like anode layer and firing it to at least partially sinter the anode material, applying a green solid oxide electrolyte layer to the sintered anode layer and then firing it to sinter the electrolyte material and, if necessary, the anode material. If the laminated structure has curled at the edges due to the different densities of the anode layer and electrolyte layer, weights may be applied to the curled edges before firing the laminated structure again in a process known as creep flattening. Alternatively, the weights may be applied to the edges of the structure before firing the electrolyte layer. Subsequently, a green ceramic or ceramic-like cathode layer is applied to the side of the sintered electrolyte layer remote from the anode material and sintered. The cathode layer is relatively thin, is generally sintered at a lower temperature than the electrolyte and may not extend to the edges of the electrolyte layer, so it generally does not present any problem with curling. In an alternative arrangement, rather than applying weights to the two-layer laminated structure and firing the weighted structure, the curled edges of the sintered laminated structure are ground or trimmed off to provide a substantially flat structure.

It would be highly advantageous to alleviate such curling at the edges of a fired laminated structure.

SUMMARY OF THE DRAWING

According to the present invention there is provided a method of forming a sintered laminated structure comprising laminating first and second layers of green sinterable material so that the second layer is on one face of the first layer and extends to at least one edge of the first layer, the material of the second layer having a shrinkage rate during firing which is less than that of the material of the first layer, applying an edge strip of green sinterable material to an opposite face of the first layer along said at least one edge to form with the first and second layers a green laminated structure, the material of said strip having a shrinkage rate during firing which is less than that of the material of the first layer, and firing the green laminated structure to form the sintered laminated structure.

Further according to the present invention there is provided a sintered laminated structure when formed by a method as described in the immediately preceding paragraph.

Figure 1:
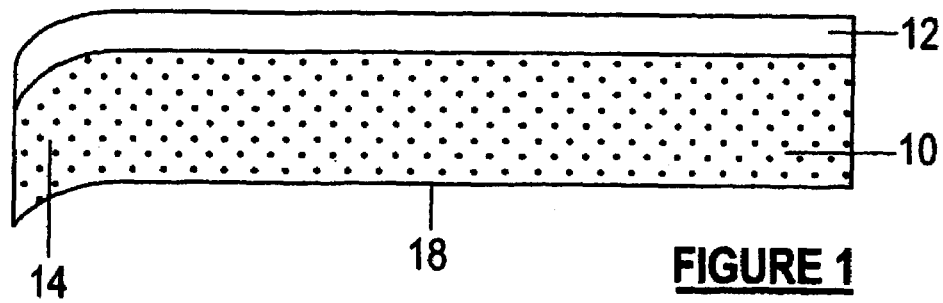

Still further according to the present invention there is provided a green laminated structure comprising a first layer of green sinterable material having a first shrinkage rate during firing and a second layer of green sinterable material on one face of the first layer extending to at least one edge of the first layer, the material of the second layer having a second shrinkage rate during firing which is less than the first shrinkage rate, and wherein the laminated structure has an edge strip of green sinterable material disposed on an opposite face of the first layer along said at least one edge, the material of said strip having a shrinkage rate during firing which is less than said first shrinkage rate.

Yet still further according to the present invention there is provided a sintered laminated structure which is substantially flat along at least one edge, comprising a first layer of sintered material having a first porosity, a second layer of sintered material on one face of the first layer and extending to at least one edge of the first layer, the sintered material of the second layer having a porosity less than the first porosity, and an edge strip of sintered material on an opposite face of the first layer extending along said at least one edge, the porosity of the material of said edge strip being less than the first porosity, and said first layer, second layer and edge strip having been sintered together.

In one preferred embodiment, the sintered laminated structure is a planar solid oxide fuel cell, in which said first layer is an anode layer and said second layer is a solid oxide electrolyte, wherein a third, cathode layer is disposed on a face of the second layer remote from the first layer. The third, cathode layer may be disposed and fired on the second layer after the first layer, second layer and edge strip have been sintered together. In one embodiment, for example for use in a fuel cell assembly of the type described in our International patent application WO 98/57384, the cathode material does not extend to the edges of the second layer, permitting a seal material to be applied to the face of the second layer remote from the first layer along the edges thereof Yet also still further according to the present invention there is provided a fuel cell assembly for producing electricity from a fuel and an oxygen-containing gas, which includes at least one solid oxide fuel cell as described in the immediately preceding paragraph.

Preferably, the second layer of sinterable material extends to all edges of the first layer, and the edge strip of green sinterable material also extends along all of said edges. Generally, the laminated structure will have a rectangular or other multi-edged shape with clear angles between adjacent edges, but the invention is equally applicable to a laminated structure having a continuously curved edge, such as round or oval, or a laminated structure having a combination of curved and linear edges, and the term "at least one edge" shall be construed accordingly to mean at least part of the overall edge or edges of the first layer.

The edge strip of green sinterable material applied to the edge or edges of the first layer may be continuous or formed in plural parts. The edge strip may be formed and applied to the first layer in a variety of different ways. In one embodiment, the edge strip is tape cast, bonded and pressed onto the first layer. In another embodiment, the edge strip may be screen printed onto the first layer. The edge strip may stand wholly proud of the first layer, or may be partially or wholly embedded in the first layer. Without wishing to be bound by theory, it is believed that the edge strip alleviates curling of the at least one edge by restricting the movement of the particles of the first layer during sintering.

Partly or wholly embedding the edge strip in the first layer will density the at least one edge of the first layer. This can be advantageous where the sintered laminated structure is used to form a fuel cell since a glass or other seal material which softens at the elevated operating temperature of a fuel cell can be applied to the at least one edge of the first layer and be absorbed into the denser edge region with less risk of the softened seal material spreading to the less dense portion of the first layer remote from the at least one edge. Thus, the seal material may be absorbed into the edge region of the first layer but be prevented from spreading into a core region by capillary action.

The edge strip may be removed from the sintered laminated structure, for example by grinding, but in some embodiments of the sintered laminated structure, including in some fuel cells, this is not necessary since the sintered edge strip need not have a detrimental effect on the performance of the sintered laminated structure.

Preferably, the shrinkage rate and porosity of the materials of the edge strip and second layer are similar or at least of the same order. It is not believed to be essential that the material of the edge strip is identical to the material of the second layer, or that it has an identical shrinkage rate during firing or porosity before or after firing. Preferably, the shrinkage rate of the edge strip differs by no more than 25%, more preferably by no more than 10%, from the shrinkage rate of the second layer. Similar considerations apply to the relative porosities of the edge strip and second layer. Similar considerations may also apply to other shrinkage characteristics of the edge strip and second layer, such as the rate of shrinkage at different stages of sintering and material reactivity. For convenience, the sinterable materials and the porosities of the edge strip and second layer are the same or closely similar. Thus, the sinterable materials are preferably of the same general type. For example, in the case of a second layer formed of $Y_2O_3$-doped $ZrO_2$, the material of the edge strip may be zirconia, preferably also $Y_2O_3$-doped. Where the edge strip(s) is narrower than the second layer it may have a density slightly greater than that of the second layer, for example up to 5 or 10% greater, to compensate at least partially for the differences in size.

There is no maximum width restriction to the edge strip since the edge strip(s) could overlie the whole of the first layer in the method of the invention, but this is generally unnecessary and not preferred. However, for convenience and ease of subsequent use of the laminated structure, it is preferred that the width of the edge strip is no greater than the width of the edge portion of the laminated structure which would curl but for the presence of the edge strip. Similar considerations apply to the minimum width of the strip. Advantageously, the edge strip has the minimum width necessary to provide the desired performance of alleviating curling of the edge portion. While this desired width is not necessarily a function of the parallel dimension of the first layer, in most embodiments the width of the edge strip along said one edge is no more than about 20%, for example about 5 to 10%, of the parallel dimension of the first layer. In a preferred embodiment, the edge strip has a width in the range 3 to 10 mm, preferably about 5 mm for 50×50 mm laminated structures and wider for larger structures, eg. about 7 mm for 110×90 mm structures. Where in be applied to the at least one edge of the first layer, such as may be the case in a fuel cell, the edge strip advantageously extends laterally inwardly from the at least one edge to substantially the same extent as the seal or other edging material.

Like its shrinkage rate, sinterability and porosity, the thickness of the edge strip may be chosen by trial and error so as to minimise curling at the edge portion of the laminated structure, while alleviating other undesirable effects such as cracking, delaminating and deformation of the second layer opposite the edge strip. The thickness of the edge strip is preferably within about 25% of that of the second layer, partly dependent upon the relative densities of the materials.

The green sinterable materials of the first layer, second layer and edge strip will contain binder material in order to hold the particulate ceramic or ceramic-like material together prior to firing. The densities and shrinkage rates of the respective layers and edge strip may be controlled to a degree by adjusting the binder content, but the freedom to manipulate the binder content of the first and second layers will be restricted in the usual way by the requirements of the green material and of the sintered material. However, the binder content of the edge strip may be conveniently adjusted by trial and error to provide the optimum shrinkage therein with no curling of the at least one edge. With similar sinterable materials for the edge strip and the second layer it is believed that the optimum binder content in the edge strip is slightly less than that of the second layer, for example in the range 10 to 20% less, preferably about 15% less. This has been found to avoid the edge strip creating a step at the edge portion of the laminated structure, while providing the desired alleviation of curling. Suitable binder materials for the edge strip and other layers include polyvinyl butyral. The second layer may have a binder content in the range of, for example, 20 to 25 wt % of the sinterable material.

Advantageously, prior to application of the edge strip to the opposite face of the first layer, plasticiser and/or solvent material is applied to the opposite face of the first layer along said at least one edge in order to soften the binder in the green sinterable material of the first layer and permit the edge strip to be bonded to and/or at least partly embedded in the material of the first layer. The plasticiser and/or solvent may be applied as a thin layer by any suitable means, including spraying or brushing. The choice of whether to use plasticiser and/or solvent may be made by trial and error, but will usually be dependent upon the timing of the application of the edge strip. A solvent applied to the opposed face of the first layer will dry relatively quickly, whereas a plasticiser will extend the time allowed for application of the edge strip and preferably a mixture is used. Any of the usual plasticisers and solvents for the particular binder material may be selected for softening the binder to allow application of the edge strip, eg. phthalate plasticiser for organic solvents such as alcohols, toluene, xylene and ketones.

It will be appreciated that the present invention is not concerned with overall curvature of the laminated structure which may occur during sintering even in the method of the present invention. The invention is aimed at alleviating curling of the at least one edge.

It will also be appreciated that each of the first and second layers of green sinterable material may be formed of plural layers of the material laminated together. This may permit, for example, different binder contents and/or different particle sizes to be used at particular depths of the respective first and second layers. In accordance with the invention, it is the overall shrinkage rate of the second layer which must be less than the overall shrinkage rate of the first layer.

One embodiment of a method and laminated structure in accordance with the present invention will now be described by way of example only, with reference to the accompanying drawings in which:

BRIEF DESCRIPTION OF THE DRAWINGS

Figure 2:
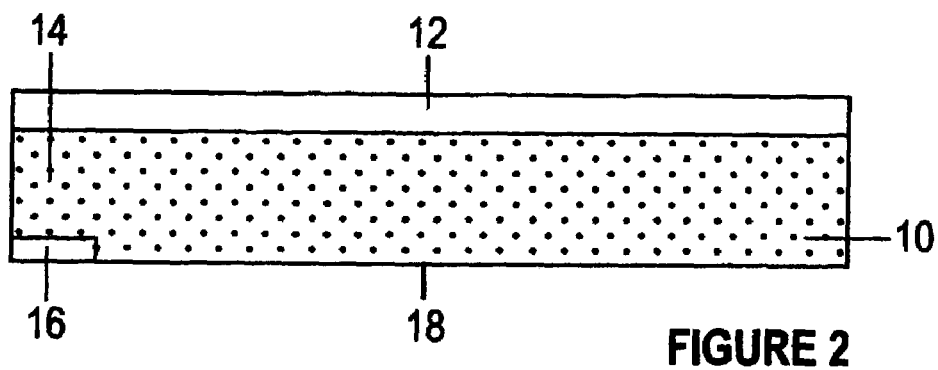
Figure 3:
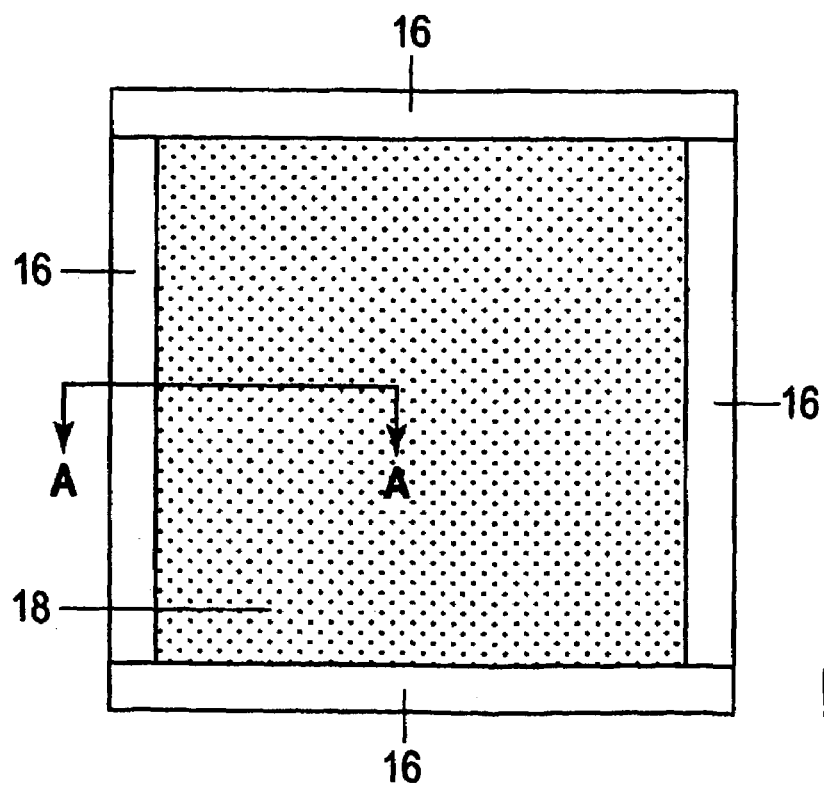

FIG. 1 is a cross-section through part of a prior art sintered laminated structure showing curling at one edge portion;

FIG. 2 is the same cross-section as FIG. 1, but with the laminated structure modified in accordance with the invention to alleviate curling along the at least one edge; and FIG. 3 is a plan view from below of the laminated structure of FIG. 2 prior to sintering—the cross-section A—A of FIG. 2 is shown in FIG. 3.

DETAILED DESCRIPTION

Referring to FIG. 1, there is shown part of a sub-structure of a solid oxide fuel cell comprising an anode layer 10 and an electrolyte layer 12, including one edge portion 14 of the sub-structure. The overall sub-structure has a rectangular configuration with dimensions of about 110×90 mm, and the anode layer 10 has a thickness in the range of about 0.5 to 1.0 mm, for example 0.9 mm, while the solid oxide electrolyte layer 12 has a thickness in the range of 10 to 50 microns, for example about 20 microns. These dimensions are given by way of illustration only, and other arrangements are possible. For example, as described the anode layer 10 will be the support structure in the fuel cell, but in other embodiments a thicker electrolyte layer may be used as the support layer for a thinner anode layer.

The solid oxide electrolyte layer 12 comprises $Y_2O_3$-doped $ZrO_2$ (YSZ) which has been sintered into a dense layer to provide a barrier to fuel gas on the side of the anode layer 10 and oxygen containing gas on the other side. The anode layer 10 comprises a porous Ni—YSZ cermet which in use permits the fuel gas to pass therethrough and react at the anode/electrolyte interface. The complete fuel cell will include a sintered porous cathode layer on the other side of the electrolyte layer 12.

The sub-structure partly illustrated in FIG. 1 is formed by tape casting a green anode material, optionally in plural layers (not illustrated) with varying levels of binder content. The green material has a particle size in the range of about 0.5 to about 10 microns and the particulate material is held together by a binder such as acrylic binder at a binder content of about 23 wt % of the green anode material to provide a porous structure.

The green solid oxide electrolyte material is tape cast and roll laminated onto the green anode material and has a particle size in the range of about 0.5 to about 5 microns with the particulate material being held together by a binder such as polyvinyl butyral at a binder content also of about 23 wt % of the green electrolyte material. This preferred relatively high binder content in the green electrolyte material was adopted in an attempt to match the shrinkage rate of the porous anode material, but this is not possible given the different densities of the materials and on sintering the sub-structure at a temperature in the range of about 900 to about 1400° C. the edges of the sub-structure curl away from the denser electrolyte layer as the more porous anode layer tries to shrink more, as shown at the one edge portion 14 in FIG. 1.

The curling of the edges of the sub-structure is not desirable in a fuel cell and must be ground off the anode layer, or the curled edges may be trimmed off. Alternatively, the anode layer may be fired first, before the green electrolyte material is disposed on it and then fired, but this is equally inconvenient. Eventually, a thin cathode layer of, for example, strontium-doped lanthanum manganite having a thickness in the range of about 50 to 100 microns is screen printed onto the side of the electrolyte layer 12 remote from the anode layer 10.

In accordance with the invention, it has now been found that the curling of the edges of the sub-structure described with reference to FIG. 1 may be alleviated by providing an edge strip 16 of denser green material than the green anode material on the face 18 of the green anode material remote from the electrolyte material along said edge portion 14.

As illustrated, the strip 16 has a width of about 7 mm and a thickness in the range of about 20 to 50 microns, for example about 30 to 40 microns, preferably about 35 microns. The green material of the edge strip 16 is substantially identical to that of the electrolyte layer 12, that is YSZ having a similar density with a binder content in the range of 17 to 25 wt % of the overall strip green material. The preferred binder content of the green strip material may be determined by trial and error at a level which alleviates the curling of the edge portion 14, and in one embodiment it has been found that a binder content of about 20 wt % is satisfactory compared to a binder content of about 23 wt % for the green material of the electrolyte layer.

The green material of the edge strip may be tape cast at the desired width or may be cut from a wider tape. Prior to application of the green strip material to the face 18 of the green anode material, a light coating of solvent/plasticiser mix is applied, for example by brushing, to the edge portion 14 of the face 18 to which the strip of green material is to be applied. The solvent may be ethanol and the plasticiser benzyl butyl phthalate mixed in a weight ratio of about 2.5 to 5:1, preferably about 3.5:1. The green strip material is then applied to the edge portion 14 and air bubbles are rolled out.

This procedure is repeated along all of the edges of the face 18 of the green anode material and, as illustrated, the green strips are then pressed into the green anode material.

The overall sub-structure is then fired at the usual temperature of about 1400° C. to produce, after firing, a sub-structure in which the edges are at least substantially flat. In the example described, the edge curl was less than 0.2 mm in a batch of the sintered laminated structures, with many showing edge curl of less than 0.1 mm, compared to edge curl of at least 2 mm, and as great 5 mm, in the aforementioned comparative example without the edge strips.

Those skilled in the art will appreciate that the invention described herein is susceptible to variations and modifications other than those specifically described. It is to be understood that the invention includes all such variations and modifications which fall within its spirit and scope.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference to any prior art in this specification is not, and should not be taken as, an acknowledgment or any form of suggestion that that prior art forms part of the common general knowledge.

The invention claimed is:

1. A method of forming a sintered laminated structure comprising laminating first and second layers of green sinterable material so that the second layer is on one face of the first layer and extends to at least one edge of the first layer, the material of the second layer having a shrinkage rate during firing which is less than that of the material of the first layer, applying an edge strip of green sinterable material to an opposite face of the first layer along said at least one edge to form with the first and second layers a green laminated structure, the material of said strip having a shrinkage rate during firing which is less than that of the material of the first layer, and firing the green laminated structure to form the sintered laminated structure.

2. A method according to claim 1 in which the second layer extends to all edges of the first layer on said one face and the edge strip extends to all of said edges.

3. A method according to claim 1 in which the edge strip is formed in plural parts.

4. A method according to claim 1 in which after the firing step the edge strip is removed from the sintered laminated structure.

5. A method according to claim 1 in which the shrinkage rate of the edge strip differs by no more than 25% from the shrinkage rate of the second layer.

6. A method according to claim 5 which the shrinkage rate of the edge strip differs by no more than 10% from the shrinkage rate of the second layer.

7. A method according to claim 1 in which the width of the edge strip is no greater than about the width of the edge portion of the laminated structure which would curl but for the presence of the edge strip.

8. A method according to claim 1 in which the width of the edge strip along said one edge is no more than about 20% of the parallel dimension of the first layer.

9. A method according to claim 8 in which the width of the edge strip along said one edge is in the range of about 5 to 10% of the parallel dimension of the first layer.

10. A method according to claim 1 in which the thickness of the edge strip is within about 25% of that of the second layer.

11. A method according to claim 1 in which the edge strip has a density up to 10% greater than that of the second layer.

12. A method according to claim 1 in which the sinterable material of the edge strip and the sinterable material of the second layer are closely similar.

13. A method according to claim 12 in which the sinterable material of the second layer is $Y_2O_3$-doped $ZrO_2$ and the sinterable material of the edge strip is $ZrO_2$, optionally doped with $Y_2O_3$.

14. A method according to claim 12 in which the sinterable material of each of the edge strip and second layer are held together with a respective binder, and wherein the percentage binder contact of the edge strip is up to about 20% less than that of the second layer.

15. A method according to claim 14 in which the percentage binder contact of the edge strip is about 15% less than that of the second layer.

16. A method according to claim 1 in which the second layer has a binder content in the range of about 20 to 25 wt % of the sinterable material.

17. A method according to claim 1 in which the edge strip is bonded to the opposed face of the first layer.

18. A method according to claim 17 in which plasticiser and/or solvent material is applied to the opposed face of the first layer along said at least one edge prior to application of the edge strip thereto.

19. A method according to claim 1 in which the edge strip is at least partly embedded in the first layer.

20. A method according to claim 1 in which the edge strip is tape cast.

21. A method according to claim 1 in which the edge strip is screen printed on to the first layer.

22. A method according to claim 1 in which one or both of the first layer and second layer is formed of plural layers of green sinterable material laminated together.

23. A method according to claim 1 in which the first layer is an anode layer of a solid oxide fuel cell and the second layer is an electrolyte layer of the solid oxide fuel cell, and wherein the method includes the step of applying a cathode layer of green sinterable material on a face of the second layer remote from the first layer and firing the green sinterable material of the cathode layer.

24. A method according to claim 23 in which the cathode layer is applied and fired after the first layer, second layer and edge strip have been sintered together.

25. A method according to claim 23 in which the cathode layer does not extend to the edges of the second layer.

26. A green laminated structure comprising a first layer of green sinterable material having a first shrinkage rate during firing and a second layer of green sinterable material on one face of the first layer extending to at least one edge of the first layer, the material of the second layer having a second shrinkage rate during firing which is less than the first shrinkage rate, and wherein the laminated structure has an edge strip of green sinterable material disposed on an opposite face of the first layer along said at least one edge, the material of said strip having a shrinkage rate during firing which is less than said first shrinkage rate.

27. A green laminated structure according to claim 26 in which the second layer extends to all edges of the first layer on said one face and the edge strip extends to all of said edges.

28. A green laminated structure according to claim 26 in which the edge strip is in plural parts.

29. A green laminated structure according to claim 26 in which the shrinkage rate of the edge strip differs by no more than 25% from the shrinkage rate of the second layer.

30. A green laminated structure according to claim 29 in which the shrinkage rate of the edge strip differs by no more than 10% from the shrinkage rate of the second layer.

31. A green laminated structure according to claim 26 in which the width of the edge strip is no greater than about the width of the edge portion of the laminated structure which would curl but for the presence of the edge strip.

32. A green laminated structure according to claim 26 in which the width of the edge strip along said one edge is no more than about 20% of the parallel dimension of the first layer.

33. A green laminated structure according to claim 32 in which the width of the edge strip along said one edge is in the range of about 5 to 10% of the parallel dimension of the first layer.

34. A green laminated structure according to claim 26 in which the thickness of the edge strip is within about 25% of that of the second layer.

35. A green laminated structure according to claim 26 in which the edge strip has a density up to 10% greater than that of the second layer.

36. A green laminated structure according to claim 26 in which the sinterable material of the edge strip and the sinterable material of the second layer are closely similar.

37. A green laminated structure according to claim 36 in which the sinterable material of the second layer is $Y_2O_3$-doped $ZrO_2$ and the sinterable material of the edge strip is $ZrO_2$, optionally doped with $Y_2O_3$.

38. A green laminated structure according to claim 36 in which the sinterable material of each of the edge strip and second layer are held together with a respective binder, and wherein the percentage binder contact of the edge strip is up to about 20% less than that of the second layer.

39. A green laminated structure according to claim 38 in which the percentage binder contact of the edge strip is about 15% less than that of the second layer.

40. A green laminated structure according to claim 26 in which the second layer has a binder content in the range of about 20 to 25 wt % of the sinterable material.

41. A green laminated structure according to claim 26 in which the edge strip is bonded to the opposed face of the first layer.

42. A green laminated structure according to claim 41 in which plasticiser and/or solvent material is applied to the opposed face of the first layer along said at least one edge prior to application of the edge strip thereto.

43. A green laminated structure according to claim 26 in which the edge strip is at least partly embedded in the first layer.

44. A green laminated structure according to claim 26 in which the edge strip is tape cast.

45. A green laminated structure according to claim 26 in which the edge strip is screen printed on to the first layer.

46. A green laminated structure according to claim 26 in which one or both of the first layer and second layer is formed of plural layers of green sinterable material laminated together.

47. A green laminated structure according to claim 26 in which the first layer is an anode layer of a solid oxide fuel cell and the second layer is an electrolyte layer of the solid oxide fuel cell.

48. A sintered laminated structure which is substantially flat along at least one edge, comprising a first layer of sintered material having a first porosity, a second layer of sintered material on one face of the first layer and extending to at least one edge of the first layer, the sintered material of the second layer having a porosity less than the first porosity, and an edge strip of sintered material on an opposite face of the first layer extending along said at least one edge, the porosity of the material of said edge strip being less than the first porosity, wherein said sintered laminated structure is formed by laminating said first and second layers as respective layers of green sinterable material so that the second layer is on said one face of the first layer and extends to said at least one edge of the first layer, the green sinterable material of the second layer having a shrinkage rate during firing which is less than that of the green sinterable material of the first layer, applying said edge strip as an edge strip of green sinterable material to an opposite face of the first layer of green sinterable material alone said at least one edge to form with the first and second layers a green laminated structure, the green sinterable material of said edge strip having a shrinkage rate during firing which is less than that of the green sinterable material of the first layer, and firing the green laminated structure.

49. A sintered laminated structure according to claim 48 in which the second layer extends to all edges of the first layer on said one face and the edge strip extends to all of said edges.

50. A sintered laminated structure according to claim 48 in which the edge strip is in plural parts.

51. A sintered laminated structure according to claim 48 in which the porosity of the edge strip differs by no more than 25% from the porosity of the second layer.

52. A sintered laminated structure according to claim 51 in which the porosity of the edge strip differs by no more than 10% from the porosity of the second layer.

53. A sintered laminated structure according to claim 48 in which the width of the edge strip is no greater than about the width of the edge portion of the laminated structure which would have curled but for the presence of the edge strip.

54. A sintered laminated structure according to claim 48 in which the width of the edge strip along said one edge is no more than about 20% of the parallel dimension of the first layer.

55. A sintered laminated structure according to claim 54 in which the width of the edge strip along said one edge is in the range of about 5 to 10% of the parallel dimension of the first layer.

56. A sintered laminated structure according to claim 48 in which the thickness of the edge strip is within about 25% of that of the second layer.

57. A sintered laminated structure according to claim 48 in which the edge strip has a density up to 10% greater than that of the second layer.

58. A sintered laminated structure according to claim 48 in which the sintered material of the edge strip and the sintered material of the second layer are closely similar.

59. A sintered laminated structure according to claim 58 in which the sintered material of the second layer is $Y_2O_3$-doped $ZrO_2$ and the sintered material of the edge strip is $ZrO_2$, optionally doped with $Y_2O_3$.

60. A sintered laminated structure according to claim 48 in which the green sinterable material of the edge strip has been tape cast and bonded to the first layer of green sinterable material.

61. A sintered laminated structure according to claim 48 in which the green sinterable material of the edge strip has been screen printed on to the first layer of green sinterable material.

62. A sintered laminated structure according to claim 48 in which one or both of the first layer and second layer is formed of plural layers of sintered material laminated together.

63. A sintered laminated structure according to claim 48 in which the edge strip is embedded in the first layer.

64. A sintered laminated structure according to claim 48 from which the edge strip has been removed.

65. A sintered laminated structure according to claim 48 in which the first layer is an anode layer of a solid oxide fuel cell and the second layer is an electrolyte layer of the solid oxide fuel cell.

66. A sintered laminated structure according to claim 65 in which a cathode layer is disposed on a face of the second layer remote from the first layer to form the solid oxide fuel cell.

67. A sintered laminated structure according to claim 66 in which the cathode layer does not extend to the edges of the second layer.

68. A fuel cell assembly for producing electricity from a fuel and an oxygen-containing gas, which includes at least one solid oxide fuel cell according to claim 66.

69. A fuel cell assembly according to claim 68 in which the at least one edge of the first layer has been densified by at least partly embedding the edge strip in the first layer and wherein a seal material applied to the at least one edge has been absorbed into the denser edge region of the first layer.

* * * * *